United States Patent [19]

Davis et al.

[11] 4,255,246
[45] Mar. 10, 1981

[54] ELECTROLYTIC CELL FOR CHLORINE PRODUCTION

[76] Inventors: David W. Davis, 100 Tico Rd., Titusville, Fla. 32780; Donald F. Helenthal, 380 Sherwood Ave., Satellite Beach, Fla. 32937

[21] Appl. No.: 7,340

[22] Filed: Jan. 29, 1979

[51] Int. Cl.³ .......................... C25B 9/00; C25B 1/24; C25B 11/02; C25B 15/02
[52] U.S. Cl. ..................... 204/228; 204/95; 204/272; 204/275; 204/286; 204/288; 204/290 R
[58] Field of Search .............. 204/237, 239, 228, 275, 204/288, 289, 149, DIG. 8, DIG. 9, 95, 272, 284

[56] References Cited

U.S. PATENT DOCUMENTS

| | | | |
|---|---|---|---|
| 553,464 | 1/1896 | Hermite | 204/286 |
| 1,209,710 | 12/1916 | Huth | 204/286 |
| 1,269,128 | 6/1918 | Stuart | 204/284 |
| 1,448,208 | 3/1923 | Gerstle | 204/288 X |
| 1,992,310 | 2/1935 | Hultman | 204/237 X |
| 4,087,337 | 5/1978 | Bennett | 204/228 X |
| 4,132,622 | 1/1979 | Kenney | 204/228 X |

Primary Examiner—G. L. Kaplan
Assistant Examiner—D. R. Valentine
Attorney, Agent, or Firm—Richard Dixon

[57] ABSTRACT

The present invention relates to a method and electrolytic cell for making hypochlorous acid (HClO) by electrolysis of an aqueous chloride solution circulating through a generally closed-loop system. The electrolytic cell includes a first electrode comprising a plurality of first wires which are generally spaced from each other, and a second electrode comprising a plurality of second wires generally spaced from each other. The first wires are juxtaposed with the second wires so as to form a passageway for enabling the flow of the chloride solution therebetween. The two electrodes are carried within a housing which includes an inlet opening and an outlet opening coupled to a conduit and spaced on the housing for guiding the flow of the chloride solution over the electrodes. Electronics are provided for impressing an electrical potential of opposing polarity onto the first and second electrodes, thereby enabling the electrolysis of the chloride solution therebetween.

16 Claims, 6 Drawing Figures

ELECTROLYTIC CELL FOR CHLORINE PRODUCTION

BACKGROUND OF THE INVENTION

I. Field of the Invention

The present invention relates to an electrolytic cell of the type used in closed-loop water systems for producing chlorine in sufficient quantities to sanitize the water therein.

II. Description of the Prior Art

It is a well known fact that large, open and stagnant bodies of fresh water become unsanitary for human consumption or use after a prolonged period of time due to the growth of bacteria and algea. One commonly accepted solution to this problem,is the use of chlorine in small quantities for inhibiting the growth of the bacteria and algae. While the common swimming pool is perhaps the best known example of the chlorinated circulating water system, the same general chlorination system may also be used in other closed water systems such as air conditioners, water purifications systems, food processing plants, laundry water systems, municipal water supplies, etc.

In the common swimming pool the typical chemical treatment requires the frequent addition of small amounts of an unstable alkaline reacting agent, such as sodium or calcium hypochlorite, which chemically decomposes and releases hypochlorous acid, which is the major disinfectant used in sterilizing the water. Unfortunately, the hypochlorites which are added to the water usually are contaminated with hydroxides which result in the undesirable side effect of increasing the alkaline content of the water. This requires the addition of some form of acid in order to control the ph level of the water. The presence of strong sunlight and warm temperatures for extended periods generally accelerates the decomposition of the chlorine within the closed water system, thereby necessitating the addition of the hypochlorite materials, and thus further exacerbating the problem of maintaining the proper chemical balance within the closed water system.

Several previous attempts have been made to eliminate the necessity of periodically adding the hypochlorite material to the body of water. One method requires the use of a sodium chloride (typical salt) material which is added to the water in the swimming pool. A pair of electrodes are then utilized to produce a chemical reaction. Chlorine is generally formed at the anode electrode and combines with the hydrogen present in the water in order to form hydrochloric acid and hypochlorous acid. The positive sodium ions are attracted toward the cathode and join with the water in order to form sodium hydroxide and hydrogen gas. The sodium hydroxide and the hydrochloric acid recombine to produce water and sodium chloride, the two original ingredients, and the chemical process begins again.

This general chemical reaction is well known in the art. For example, Gwynn in U.S. Pat. No. 3,479,275, discloses the use of an electrolytic cell formed from a transparent casing which encloses a plurality of electrodes in the form of generally parallel spaced plates. The saline solution is pumped between the plates which are energized with a d.c. voltage potential in order to promote the electrolysis action described above. Gwynn periodically reverses the voltage potential across the electrodes in order to prevent the deposition of calcium or other such materials upon the electrodes. While this type of system is chemically effective, the proper functioning of the electrodes requires that they be manufactured from expensive metals such as the noble metals consisting of platinum, rhodium, iridium, osmium and palladium. These metals are both expensive and somewhat difficult to work with, and therefore are not economically well suited for large scale production. For additional background material see also the discussion of non-corroding electrodes as described by Tirrell in U.S. Pat. No. 3,117,023.

Another typical electrolytic system for chlorinating swimming pool water is disclosed by Kirkham in U.S. Pat. No. 3,669,857. This system utilizes a cation selective membrane for separating the two electrodes. While this type of system is chemically effective, it is also expensive to produce and maintain, thereby being at a serious competitive disadvantage with other similar, less expensive and equally effective systems.

Another electrolytic cell for chlorine production is described by Colvin in U.S. Pat. No. 3,476,675. This electrolytic cell again uses flat, porous plates which suffer from the same economic and manufacturing limitations as previously described. In U.S. Pat. No. 3,378,479, Colvin discloses the use of a metal screen mesh as the anode of the electrolytic device. However, the cathode of the electrolytic device is formed from a flat ribbon with a relatively large surface area. Both the cathode and the anode of the electrolytic cell require large surface areas which correspond to increased expenditures for the noble metals required.

The following inventors have attempted to refine this electrolytic process, and to some degree have succeeded in reducing the costs of producing an efficient electrolytic cell. See for example Slater in U.S. Pat. No. 1,397,239, Leslie in U.S. Pat. No. 2,820,701, Gray in U.S. Pat. No. 3,481,857, Copper in U.S. Pat. No. 3,390,065, Colvin in U.S. Pat. No. 3,378,479 and Krane in U.S. Pat. No. 3,458,414. Other related disclosures are contained in U.S. Pat. No. 3,917,520 to Katz, U.S. Pat. No. 3,117,023 to Tirrell and U.S. Pat. No. 3,963,592 to Lindstrom.

While the present invention utilizes the same basic chemical process as described in the preceding references, the present invention uses special electrodes and a special housing for the electrodes, neither of which are disclosed in any of the prior art references. Various other features of the present invention add to the highly efficient operation of the electrolysis system as well as reducing costs of production and increasing reliability.

SUMMARY OF THE INVENTION

The present invention relates to an electrolytic cell for making hypochlorous acid by electrolysis of an aqueus chloride solution circulating through a generally closed-loop system. A first electrode is provided having a plurality of wires generally spaced from each other. A second electrode is provided comprising a plurality of second wires generally spaced from each other. The first wires are juxtaposed with the second wires so as to form a passageway for enabling the flow of the chloride solution therebetween. A housing is provided for carrying the two electrodes therein. The housing includes an inlet opening and an outlet opening each coupled to a conduit and spaced on the housing for guiding the flow of the chloride solution over the electrodes. An electrical circuit is provided for impressing an electrical potential of opposing polarity onto the first and the second electrodes, thereby enabling the electrolysis of the chloride solution flowing therebetween.

BRIEF DESCRIPTION OF THE DRAWINGS

Other objects features and advantages of the present invention will be apparent from a study of the written description and the drawings in which.

Figure 1:
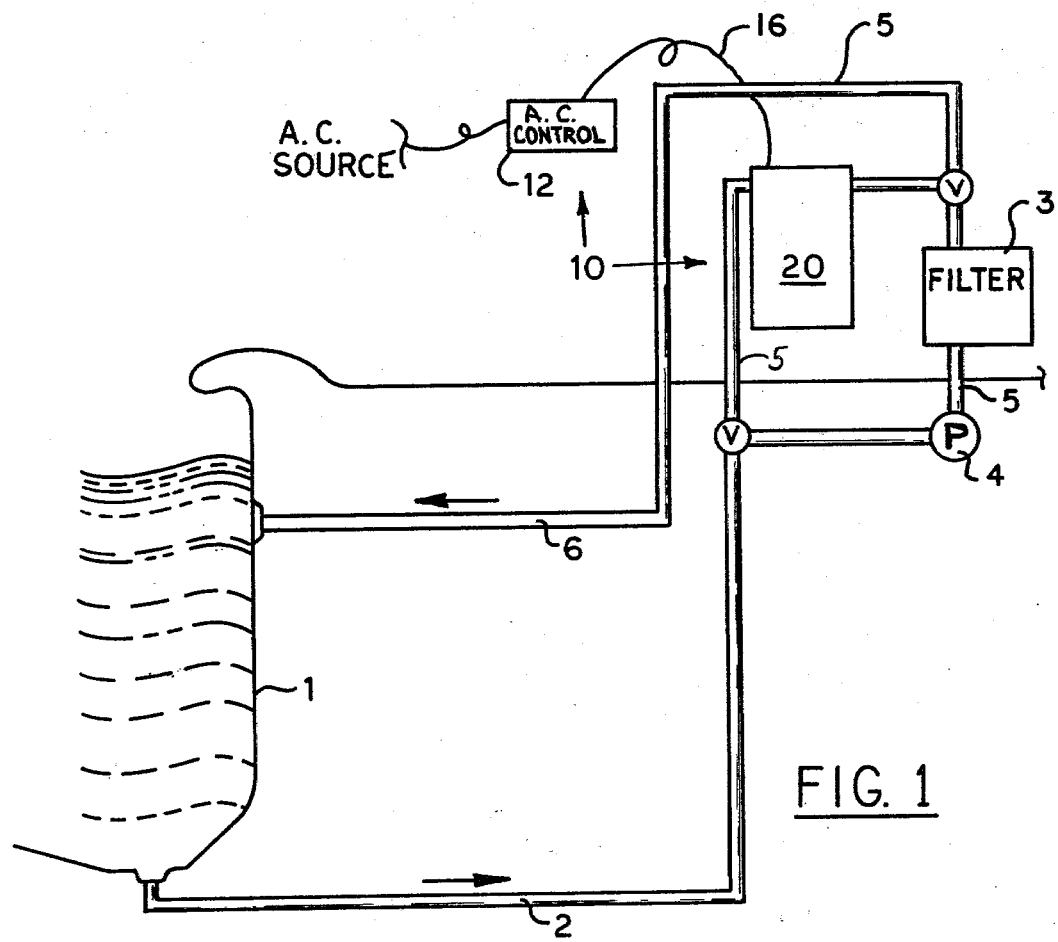
FIG. 1 illustrates a system block diagram of a swimming pool or other closed circulation water system employing the electrolytic cell for chlorine production in accordance with the present invention.

In these drawings, like reference characters refer to like parts throughout the several views of each of the embodiments of the present invention. However, variations and modifications may be effected without departing from the spirit or scope of the concepts of the disclosure and the appended claims. It should also be observed that the elements and operation of the embodiments of the present invention have been illustrated in somewhat simplified form in each of the drawings and in the specification in order to eliminate unnecessary details which would be apparent to one skilled in this art.

DETAILED DESCRIPTION OF THE PREFERRED EMBODIMENT

A first preferred embodiment of the electrolytic chlorinator in accordance with the present invention is illustrated generally as 10 in the various Figures. With specific reference to FIG. 1, the chlorinator 10 is coupled in the pump line 5 of a swimming pool system consisting of the pool 1, a drain line 2, a filter 3, a pump 4, the pump line 5 and the return line 6. Several valves may be included in the section of the pump line 5 into which the chlorinator 10 is coupled in order to regulate the flow of the water passing through the chlorinator. The chlorinator 10 is illustrated as comprising an electronics package 12 which is coupled through conductors 16 to an electrolytic cell, shown generally as 20.

The electronics package 12 is coupled to a source of a.c. electrical energy and comprises typically a rectifier and voltage regulator circuit for providing a constant but adjustable d.c. output voltage across the electrodes of the electrolytic cell 20. When the system is utilized with the typical swimming pool, it is economically desirable to maintain low power consumption within the chlorinator unit 10. This low power consumption is made possible since the typical swimming pool does not require excessive amounts of chlorine for purification. However, other applications may require larger amounts of chlorine to be generated from the electrolytic chlorinator and the size, specification and general operating perameters explained herein should be considered as typical only for the swimming pool as discussed herein. The typical voltage output from the electronics package 12 is in the range from 4 volts to 22 volts, with the typical operating output voltage being approximately 8 volts d.c. The low output voltage extends the operational life of the electrolytic cell.

The electronics package 12 also includes a voltage switching circuit, which may be a simple relay or other electronic equivalent thereto, for reversing the polarity across the electrolytic cell on a periodic basis, typically every 10 to 12 minutes. This polarity reversal provides a self-cleaning function each time the voltage is reversed. In this manner any solids, and in particular calcium, that have been deposited upon the electrolytic elements will be disengaged from the elements and will be carried away by the water circulating through the system and will eventually be deposited within the filter of the swimming pool.

The output current from the electronics package 10 may range between 12 amperes at 8 volts d.c. for an electrolytic cell of approximately 16 square inches of surface area, to a current of approximately 60 amperes at 8 volts d.c. for an electrolytic cell of approximately 80 square inches of surface area. As a baseline reference, the 16 square inch cell is typically capable of providing 0.7 lb. of chlorine per day at operation for water containing between 2,200 and 3,000 parts per million of salinity at a flow rate of approximately 2 to 4 gallons per minute.

Another important feature of the electronics subsystem 12 is that the a.c. ripple voltage variations upon the d.c. output voltage fed to the electrodes 40 must be reduced to less than approximately 1 percent of the level of the d.c. voltage. In this manner the oxidation of the platinum electrode wiring may be substantially reduced. Empirical evidence indicates that the oxidation process is typically linear with relationship to the a.c. ripple voltage impressed upon the d.c. output voltage. For example, if a 30 percent a.c. ripple voltage is impressed upon the d.c. output voltage to the electrodes, then the platinum wiring typically will oxidize and self-destruct within just a few days. On the other hand, if the a.c. ripple voltage is maintained below 1 percent of the d.c. output voltage, then a life expectancy beyond 5 years may be anticipated.

With reference to the remaining Figures, the electrolytic cell 20 includes a generally rectangular outer housing 22 formed of a tough, clear, transparent material, such as plastic or more particularly methyl methacryalte polymer (plexiglass), which has good electrical insulating properties and is generally resistant to chemical action by electrolysis and electrolysis products. The outer sheets of the acrylic housing are chemically bonded together for maximum strength. Other techniques such as extruding or casting could be used. The typical thickness of the acrylic outer housing may be between $\frac{3}{8}$" and $\frac{1}{2}$", depending upon the size of the cell and the working pressure desired. The $\frac{3}{8}$" acrylic is adequate for a 10 ampere cell with operating pressures up to 30 psi, with the $\frac{1}{2}$" acrylic thickness being required for pressures up to 40 psi.

A water inlet opening 24 is coupled through the right side of the housing 22 and opens into a first chamber 31 within the housing void. An outlet opening 26 couples through the left side of the housing 22 and opens into a second chamber 32 as part of the void defined within the housing 22. The first chamber 31 is separated from the second chamber 32 by a partition 30 which communicates between and seals off the upper portions of the left and right sections of the housing 22. The length of the partition 30 stretches from communication with the top surface of the housing 22 to a point adjacent to but spaced from a bottom surface of the housing 22 for defining a passageway 34, thereby guiding the flow of the fluid traveling from the first chamber 31 and into the second chamber 32. The level of the outlet opening 26 in the second chamber 32 is located adjacent the top of the housing 22 so as to assure that the fluid within the housing 22 will always cover the electrodes, shown generally as 40. In this manner, if the water flow is interrupted the electrodes 40 will remain covered with water and will thereby eliminate the hazards of igniting the various gases produced as by-products of the electrolytic process which typically gather adjacent the top of the cell.

In a similar manner, the inlet opening 24 is located generally adjacent to the top of the housing 22 in order to assure that when the flow of water therethrough is interrupted, the water remaining within the housing 22 will be sufficient to cover the electrodes 40.

As a further safety precaution, a plurality of small apertures 36 communicate through the partition 30 adjacent the top of the housing 22 for allowing a restricted flow of fluid from the inlet 24 directly through to the outlet opening 26. This small by-pass flow of fluid through the apertures 36 will tend to carry the gases produced as byproducts of the electrolytic action out the outlet opening 26.

A temperature sensor 70 projects through the top or side of the housing 22 and communicates into the second chamber 32 for sensing the temperature of the fluids therein. The output of the temperature sensor 70 is coupled to an override circuit in the electronics subsystem 12 and operates so as to remove the d.c. output voltage coupled to the electrodes 70 when the temperature of the fluids within the second chamber 32 exceeds a predetermined level.

A pressure sensor 72 projects through the top surface of the housing 22 into the first chamber 31 in order to sense the pressure of the fluids therein. The output of the pressure sensor 72 is coupled to a disabling circuit in the electronics package 12 so that when the water pressure at the inlet 24 falls below a predetermined minimum pressure, the d.c. output voltage on the electrodes 70 will be removed in order to stop the electrolysis process until the pressure again returns.

The electrode assembly is shown generally as 40 in FIGS. 2, 3, 4, 5 and 6. The electrode assembly 40 includes a first frame comprising a first support 41 and a second support 42 separated therefrom by a spacer 45. A first electrode wire 51 is wound around the first support 41 and the second support 42 with a longitudinal pitch sufficient to form a generally equidistant spacing between adjacent sections of the first electrode wire 51 as the winding proceeds longitudinally along the first frame. The first electrode wire 51 is a generally continuous piece of either solid platinum (or platinum alloy) or a platinum plated titanium wire (or other cold clad base metal conductor) of approximately 0.008 to 0.010 inches with typically 0.001 inches of platinum on the circumference thereof. In a typical unit the length of one complete winding, that is a single loop around the circumference of the first frame, is approximately 8 inches. Each section, or each winding, is spaced approximately 0.1 inches from the adjacent winding thereto, and the pitch is adjusted for approximately 40 winds per layer. This will produce approximately 320 linear inches of platinum wire acting as the first electrode.

Whereas the second support 42 is formed from a generally transparent and electrically insulative material, the first support 41 is formed typically of a copper-clad glass epoxy circuit board having the conductive surface 41a facing outwardly from the spacer 45. A single solid titanium conductor may be used also. In this manner the first electrode wire 51 comes into close electrical and physical communication with the conductive surface of the first support 41 once during each winding. This electrical communication is typically improved by soldering the first electrode wire 51 directly to the copper-clad printed circuit board forming the first support 41.

After the first electrode frame has been manufactured, a third support 43 is coupled in a parallel fashion to the outside surface of the first support 41, and in a like manner a fourth support 44 is coupled to the outside surface of the second support 42, thereby sandwiching the sections of the first electrode wire 51 therebetween. The third support 43 is formed from a section of copper-clad glass epoxy circuit board with the insulative surface thereof being coupled adjacent to the first support 41 through a chemical bond. Care must be taken to assure that no electrical connection is made between the first electrode wire 51 and the conductive surface 43a of the third support 43. It should be noted that the width of the third support 43 and the fourth support 44 (typically 0.525 inches) is slightly greater than the width of the first support 41 and the second support 42 (typically 0.325 inches).

Together the third support 43 and the fourth support 44 form a second frame around which is circumferentially wound a generally continuous second electrode wire 52. This wire may be made of the same material as the first electrode wire 51, namely platinum or platinum-clad titanium, but various other metals may be utilized depending upon the specific operational and environmental requirements. The adjacent sections of the second electrode wire 52 are spaced from each other by approximately 0.1 inches, thereby providing approximately 40 windings over the length of the spacer 45. The second electrode wire 52 is generally soldered to the conductive surface 43a on the outside of the third support 43 to provide the required electrical conduction and mechanical reliability.

Figure 6:
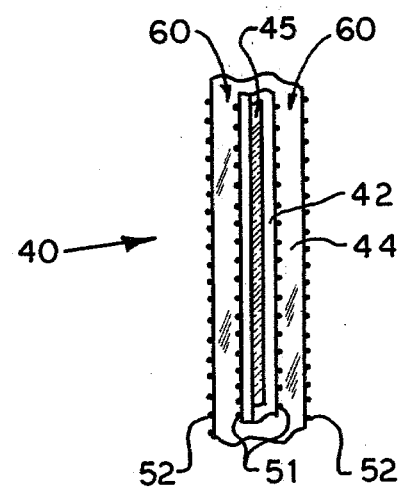
FIG. 6 illustrates a partial cross-section view taken along lines 6—6 in FIG. 4 of the wound wire electrodes of the present invention.
Figure 2:
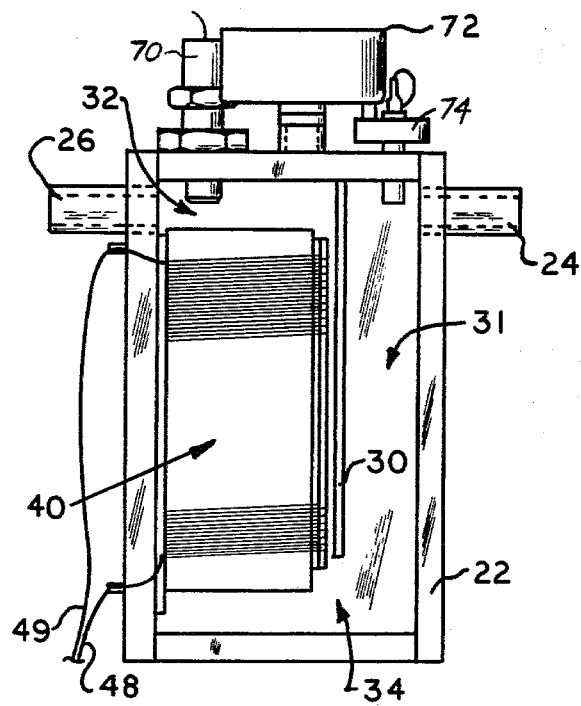
FIG. 2 is a front elevation of a first preferred embodiment of the electrolytic cell in accordance with the present invention.
Figure 3:
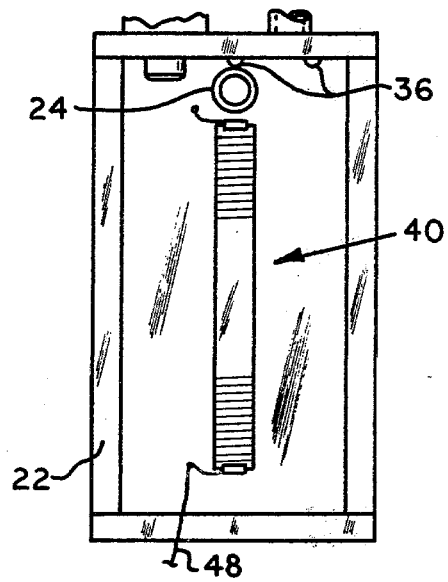
FIG. 3 illustrates a right side elevation of the present invention.
Figure 4:
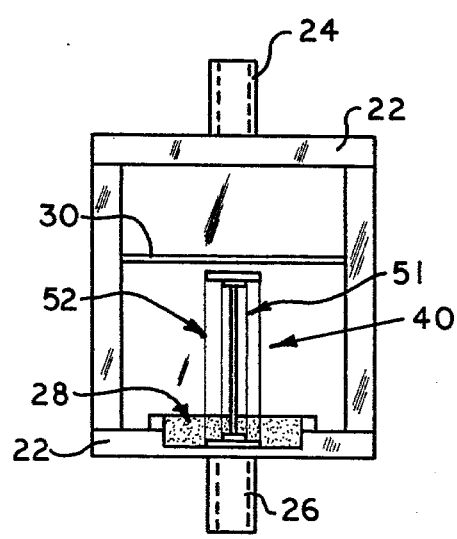
FIG. 4 illustrates a top view of the present invention.
Figure 5:
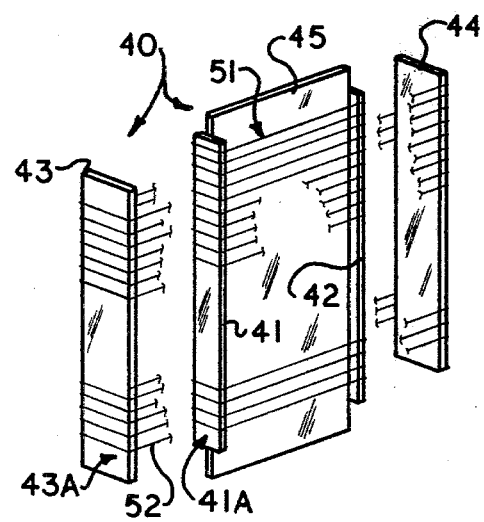
FIG. 5 illustrates an exploded perspective view of the wound wire electrodes and the corresponding frame therefor as utilized in the first preferred embodiment of the present invention.

As illustrated in FIG. 6, the first electrode wires 51 and the second electrode wires 52 define therebetween a passageway 60 (or electrolytic zone) for enabling the flow of the chlorine solution through the second chamber 32. The typical spacing between the opposite electrode pairs is approximately 0.125 inches. A typical electrolytic cell of these dimensions, that is approximately 320 linear inches of wire per electrode, or 640 total linear inches of exposed electrode, is rated nominally at 12 amperes and 8.0 volts d.c.

In a similar manner additional electrodes may be coaxially wound about the spacer 45 merely by adding additional pairs of supports to the outside surfaces of the existing frame elements. In this manner the exposed electrode wire can be increased to 1,080 linear inches of exposed electrode wire with only a small increase in the volume occupied by the electrode unit 40. Of course, the additional electrode surface will increase the current to approximately 24 amperes at approximately 8 volts d.c. The exact number of electrode windings will be determined by the size of the housing 22, the rate of flow of the saline solution through the housing 22 and the required chlorine density in the resulting aqueus solution.

The resulting electrode assembly 40 forms approximately 16 square inches of surface area and is substantially more efficient than the electrode plates as disclosed in the prior art references. The spacing between adjacent sections of the electrode wires (typically 0.1 inches) has been empirically determined to be somewhat critical in the overall efficiency of the electrolysis process. This variable is somewhat unexpected when comparing the operation of wound electrodes to the typical flat plate electrodes. Furthermore, the use of solid platinum or platinum-clad titanium wire substantially reduces the material costs as compared to platinum-coated flat plate electrodes. Since the cost of the electrodes is by far the most substantial element of the parts and labor required to construct the typical electrolytic cell, the improved electrode assembly 40 constitutes a substantial economic savings. This economic savings when coupled with the improved efficiency of this form of the electrode assembly 40 produces not only an operational but also an economic advantage of the present form of the invention over prior art electrolytic cells.

Both the first and second electrode wires 51 and 52 are wrapped with a density of approximately 10 turns per linear inch as measured along the longitudinal direction of the spacer 45. Experimentation indicates that even if the pitch of the winding is adjusted to provide 20 windings per inch, the efficiency of the electrolysis cell is not substantially or even measurably improved.

While the first preferred embodiment of the present invention illustrates the use of generally parallel spaced wires, experimentation also indicates that certain types of mesh structures may also be suitable for forming the electrode elements, as well as perforated plate structures.

The electrode assembly 40 is coupled to the inner surface of the left side plate of the housing 22 within a generally recessed rectangular area shown generally as 28. A first wire 48 is electrically coupled to the copper-clad glass epoxy printed circuit board 41 and a second wire 49 is electrically coupled to the copper-clad surface of the glass epoxy circuit board 43. Both wires 48 and 49 are routed through a small sealed bore in the left side surface of the housing 22. These electrical conductors 48 and 49 are coupled within cable 16 to the electronics package 12 for transferring the switchable polarity d.c. voltage to the electrode assembly 40.

Once the electrode assembly 40 has been placed within the recess 28 in the housing 22, then a transparent acrylic insulative sealer is poured into the recess 28 so as to restrain the movement of the electrode assembly 40. The sealer also serves to protect the copper-clad surfaces of the printed circuit boards 41 and 43 from the corrosive environment within the housing 22.

The operation of the first preferred embodiment of the present invention is generally the same as described in the prior art references. According to Faraday's Law, there is a linear proportional relationship between the current input to the electrodes 40 and the amount of water used by the cell to produce the chlorine through the electrolysis process. Therefore, by controlling the amount of electrical current flowing through the electrodes 40, the concentration of chlorine within the swimming pool can be maintained. The aqueus solution including the alkali metal halide (NaCl) is electrolized into the basic elements of sodium and chlorine. The free chlorine together with the free oxygen produced by the electrolysis of the water then together function to kill the bacteria and algae present in the water. The chlorine typically combines with the free hydrogen available in the water to form hydrochloric acid, which then combines with the sodium hydroxide to form sodium chlorine and water. The entire process then begins again through electrolysis.

As the solution continues to be circulated through the closed system, the polarity of the voltage impressed upon the electrodes 40 will be periodically reversed in order to remove the scales which often form on the electrodes. These precipitated hydroxids will either be converted into a soluble compound or will be readily loosened from the surface of the electrode and will then flow out of the electrolytic cell with the aqueus solution.

The form of the electrode assembly 40 is especially conducive to large scale production since the platinum wire may be purchased in rolls and then wound upon the frames with great efficiency and accuracy by automatic equipment. Since the number of separate electrode windings may be easily increased merely by adding additional support plates on either end of the already existing support plates 43 and 44, the available area for electrolysis may be substantially increased without significantly increasing the volume required. Furthermore, since the adjacent electrode wires are alternated, the third, fourth and fifth electrodes, etc. will provide additional efficiency because electrodes of opposite polarity are located on either side thereof.

As used herein the term "coil" does not necessarily require a circular shape, but instead signifies that one or multiple conductors are arranged longitudinally adjacent to each other with an insulative space therebetween and typically defining a void therein.

In accordance with the provisions of the U.S. Patent Laws, the preferred embodiment of the present invention has been described in detail. The principles of the present invention have been described in the best mode in which it is now contemplated such that principles may be applied. However, it should be understood that the construction shown and described in the attached specification and drawings are merely illustrative and that the invention is not limited thereto. Accordingly, alterations and modifications which readily suggest themselves to persons skilled in the art, without departing from the true spirit of the disclosure herein, are intended to be included in the scope in the following claims.

We claim:

1. An electrolytic cell for making hypochlorous acid (HClO) by the electrolysis of an aqueus chloride solution, comprising in combination:
   a first electrode comprising a plurality of first wires, and a second electrode comprising a plurality of second wires, with said first wires being juxtaposed with said second wires so as to form a passageway for enabling the flow of the chloride solution therebetween;
   a first frame having spaced first and second supports, with said first wires being wound between said first and second supports;
   a second frame having a third support coupled over said first wires to said first support, and a fourth support coupled over said second wires to said second support, with said second wires being wound between said third and fourth supports;

a housing for carrying said first and said second electrodes therewithin; and electrical means for impressing an electrical potential of opposing polarity onto said first and said second electrodes, thereby enabling the electrolysis of the chloride solution therebetween.

2. The electrolytic cell as described in claim 1 wherein said first wires are spaced from each other by a distance larger than the diameter of said wires.

3. The electrolytic cell as described in claim 2 wherein said second wires are spaced from each other by a distance larger than the diameter of said second wires.

4. The electrolytic cell as described in claim 2 wherein adjacent ones of said first wires are generally parallel to each other.

5. The electrolytic cell as described in claim 3 wherein said first wires are generally parallel and define a first open surface, and wherein said second wires are generally parallel and define a second open surface, with said first surface being uniformly spaced from said second surface.

6. The electrolytic cell as described in claim 1 wherein the surface of said first support includes a conductive strip thereon for electrically coupling with said first wires wound thereover.

7. The electrolytic cell as described in claim 6 wherein the surface of said third support includes a conductive strip thereon for electrically coupling with said second wires wound therearound.

8. The electrolytic cell as described in claim 1 wherein said first and said second wires include an external surface of platinum.

9. An electrolytic cell for making hypochlorous acid (HClO) by the electrolysis of an aqueus chloride solution, comprising in combination:
   a first electrode comprising a plurality of first wires, and a second electrode comprising a plurality of second wires;
   a housing for carrying said first and said second electrodes therewithin;
   electrical means for impressing an electrical potential of opposing polarity onto said first and said second electrodes; and
   temperature sensing means for sensing the temperature of the solution within said housing and for disabling said electrical means responsive to said temperature exceeding a predetermined limit.

10. An electrolytic cell for making hypochlorous acid (HClO) by the electrolysis of an aqueus chloride solution flowing through a circulating conduit, comprising in combination:
   a first electrode comprising a plurality of first wires, and a second electrode comprising a plurality of second wires, with said first wires being juxtaposed with said second wires so as to form a passageway for enabling the flow of the chloride solution therebetween;
   a housing for carrying said first and said second electrodes therewithin, with said housing having an inlet opening and an outlet opening each operatively coupled to the circulating conduit and spaced on said housing for guiding the flow of the chloride solution over said first and said second electrodes, with said housing further including a partition for defining a first and a second chamber within an upper section of said housing, with said inlet opening coupling into an upper section of said first chamber and with said outlet opening coupling into an upper section of said second chamber, with said first and second electrodes being located near an aperture in said partition between said first and second chambers adjacent to a lower section of said housing; and
   electrical means for impressing an electrical potential of opposing polarity onto said first and said second electrodes, thereby enabling the electrolysis of the chloride solution therebetween.

11. The electrolytic cell as described in claim 10 further including a plurality of smaller bores within said partition adjacent the upper section of said housing for bypassing fluid directly between said first and said second chambers and bypassing said aperture.

12. An electrode of the type used in electrolytic cells for making hypochlorous acid by the electrolysis of an aqueous chloride solution, said bipolar electrode comprising in combination:
   a first wire electrode comprising a first wire coil which defines a void therein; and
   a second wire electrode comprising a second wire coil, with said second wire electrode being located within said void defined by said first wire electrode such that adjacent sections of said first and said second wire electrodes are generally parallel and juxtaposed with each other so as to form a passageway to enable the flow of the chloride solution therebetween.

13. The electrode as described in claim 12 further including:
   a primary support having spaced first and second insulating elements for supporting said second wire electrode; and
   a secondary support having a third insulating element coupled over said first insulating element with sections of said second wire electrode coupled therebetween, with said secondary support also having a fourth insulating element coupled over said second insulating element with sections of said second wire electrode coupled therebetween, with said first wire electrode being coupled over secondary support.

14. The electrode as described in claim 13 wherein adjacent sections of said first wire coils define a plurality of generally planar first open surfaces, and wherein adjacent sections of said second wire coils define a plurality of generally planar second open surfaces.

15. The electrode as described in claim 14 wherein said first open surfaces are generally uniformly spaced from said second open surfaces.

16. The electrode as described in claim 13 wherein a surface of said first insulating element includes thereon a conductive strip for electrically coupling with adjacent sections of said second wire electrode, and wherein a surface of said third insulating element includes a conductive strip for electrically coupling with adjacent sections of said first wire electrode.

* * * * *